US 8,595,283 B2

(12) United States Patent
Inkinen et al.

(10) Patent No.: US 8,595,283 B2
(45) Date of Patent: Nov. 26, 2013

(54) CONTENT DELIVERY ACCORDING TO DEVICE ACTIVITY

(75) Inventors: Sami Inkinen, Ritvala (FI); Toni Östergård, Turku (FI)

(73) Assignee: Nokia Corporation, Espoo (FI)

( * ) Notice: Subject to any disclaimer, the term of this patent is extended or adjusted under 35 U.S.C. 154(b) by 3240 days.

(21) Appl. No.: 10/770,868

(22) Filed: Feb. 3, 2004

(65) Prior Publication Data

US 2004/0210628 A1 Oct. 21, 2004

(30) Foreign Application Priority Data

Feb. 10, 2003 (GB) .................................. 0303059.0

(51) Int. Cl.
*G06F 15/16* (2006.01)
(52) U.S. Cl.
USPC .......................................... 709/201; 709/231
(58) Field of Classification Search
USPC .................. 709/235, 203, 217–220, 223–232
See application file for complete search history.

(56) References Cited

U.S. PATENT DOCUMENTS

| 6,061,686 | A  | * | 5/2000 | Gauvin et al. .................. 707/10 |
| 6,067,565 | A  | * | 5/2000 | Horvitz .......................... 709/218 |
| 6,182,133 | B1 | * | 1/2001 | Horvitz .......................... 709/223 |
| 6,237,039 | B1 | * | 5/2001 | Perlman ......................... 709/237 |
| 6,239,843 | B1 | * | 5/2001 | Gaudreau ....................... 348/465 |
| 6,243,755 | B1 | * | 6/2001 | Takagi et al. .................. 709/229 |
| 6,259,819 | B1 | * | 7/2001 | Andrew et al. ................. 382/248 |
| 6,742,033 | B1 | * | 5/2004 | Smith et al. .................... 709/224 |
| 6,842,768 | B1 | * | 1/2005 | Shaffer et al. .................. 709/203 |
| 6,920,110 | B2 | * | 7/2005 | Roberts et al. ................. 370/235 |
| 7,159,182 | B2 | * | 1/2007 | Narin ............................. 715/744 |
| 2002/0052925 | A1 | * | 5/2002 | Kim et al. ...................... 709/217 |
| 2004/0205620 | A1 | * | 10/2004 | Nishikiori et al. ............. 715/523 |

FOREIGN PATENT DOCUMENTS

EP 0993165 * 12/2000 ............. H04L 29/06

OTHER PUBLICATIONS

Kanter, T., et al., "Smart Delivery of Multimedia content for Wireless Applications", 2000, ©Springer-Verlag Berlin Heidelberg, pp. 70-81.

* cited by examiner

*Primary Examiner* — Yasin Barqadle
(74) *Attorney, Agent, or Firm* — Harrington & Smith (57) ABSTRACT

A content transfer system includes a provider device 40 and a receptor device, such as a personal digital assistant 20. The receptor device 20 is arranged to monitor the activity or usage of the device, and determine or predict therefrom a period of low device activity. In such a low period of activity, content transfer control means, in the form of a controller 21, is arranged to initiate the transfer of an item of content from the provider device 40 to the receptor device 20. The content may be secondary content such as text information from a television signal. Compression, decompression or other processor intensive tasks, such as preparing the content according to the output capabilities, may also be performed during times of low device activity.

21 Claims, 2 Drawing Sheets

CONTENT DELIVERY ACCORDING TO DEVICE ACTIVITY

FIELD OF THE INVENTION

The present invention relates to methods and devices used to transfer content. In particular, although not exclusively, the invention provides resource efficient and/or user convenient use of wireless communication terminals, such as a Personal Digital Assistant (PDA) or a mobile telephone, particularly suited to the so-called mobile information society.

BACKGROUND OF THE INVENTION

The drive towards convergence has brought about a proliferation of competing technologies all of which seek to improve inter-operability between various digital devices. At present, a number of technologies are emerging as candidates for mass-market consumer products in the mobile information society. Typically, these technologies provide connectivity between devices such as televisions, PDAs, mobile telephones, computers and the like. In general, these technologies provide a transport layer which is utilized to deliver content, such as an MP3 file, an e-mail, or a video stream, between a content provider device and a content receptor device. This transfer of content from a content provider device to a content receptor device takes time, and it is on occasion inconvenient to a user, and/or resource inefficient, to transfer the often-large amounts of content.

SUMMARY OF THE INVENTION

According to a first aspect of the present invention, there is provided a system comprising a content provider device and a content receptor device, the content provider device usable to transfer content to the content receptor device, and the content receptor device operable to receive content from the content provider device and store the content on memory means, wherein either one or both of the content provider/receptor device(s) comprise content transfer control means arranged to initiate the transfer of an item of content from the content provider device to the memory means of the content receptor device according to the determination of an acceptable level of device activity.

Such an arrangement considers device activity prior to the transfer of content from the content provider device to the content receptor device. The aim of considering device activity prior to content transfer, and transferring content according to an acceptable level of determined device activity, is to make effective use of resources and/or to minimize inconvenience to a user of the content receptor device.

Device activity may be that of the content provider and/or receptor device and may distinguish between different threshold levels of device activity, such as high, moderate, low or some or no level of device activity.

It should be borne in mind that, in certain cases, the initiation will lead to the transfer of content from the content provider device to the content receptor device. In other cases, the content provider/receptor device may be busy and/or unable to respond immediately, or even respond at all, to the initiation call.

The content transfer control means can be arranged to initiate the transfer of an item of content upon determining a period of low device activity. Thus, the present invention uses periods of low device activity to seek the transfer of an item of content from the content provider device to the receptor device. Efficient use of device resources is thus accomplished by making efficient use of device resource downtime.

The content transfer control means can be comprised in the device of which the level of activity is determined. However, the content transfer control means may be contained in a device which does not determine the level of activity.

In one embodiment, the content receptor device comprises the content transfer control means. Here, the content transfer control means is arranged to determine the level of activity of the content receptor device. This would be convenient for a user as the user would not be delayed/interrupted during his/her usage of the device by, for example, the processor and other components in the receptor device being occupied by the concurrent downloading of a particular item of content.

The content transfer control means may determine device activity by analyzing the passing of time and by associating acceptable levels of device activity with particular times. For example, the content transfer control means in the content receptor device may be arranged to monitor the time, and be configured to initiate a transfer of content from the content provider device at a particular pre-determined low activity time, e.g. night-time, early morning, and/or weekends, when periods of activity of the device are expected to be low (acceptable). The content transfer control means can be programmable to allow the selection of particular times to be varied, for example, by a user of the content receptor device. Thus, the user can program and re-program different times when the transfer of content is convenient.

The content transfer control means may determine device activity by monitoring the usage of one or more of the device components, such as a processor or transmission component, over a particular time duration. For example, the content receptor device may comprise the content transfer control means configured to determine a low (acceptable) activity period by monitoring component usage over a particular time duration, wherein the content transfer control means is configured to consider that a low activity period has occurred when component usage has been below a particular threshold level over the particular time duration. Alternatively, the low activity period may be considered to have occurred when there has been no component usage at all over a particular time duration. In such embodiments, the content transfer control means determines at the end of the time duration that the device is in a low activity period and accordingly initiates transfer of content from the content provider device.

In one embodiment, device activity may be determined by content transfer control means arranged to analyze changes in the activity of the or each device over a time duration, such as a hour/day/week, in order to predict acceptable device activity levels for subsequent time durations. This embodiment predicts times for future acceptable activity levels based on learning from historical activity levels. For example, the content transfer control means may be contained within the content receptor device, and be configured to analyze levels of activity during an initial time duration to predict levels of activity during a subsequent time duration. The analysis of levels of activity may be limited to the determination of low levels of device activity.

The or each of the content provider/receptor device(s) can be configured to initiate the transfer of the whole of an item of content, as opposed to a proportion of the content item, to the memory means. This can be done during a period of low device activity.

Activity levels may not stay constant during the transfer of content. For example, a low (acceptable) activity period of one of the devices, such as that of the receptor device, may be interrupted by a high (unacceptable) activity period when a user begins to use the device. In such a case, it would be advantageous to configure the devices to suspend the transfer of the item of content until a period of acceptable device activity, such as low content receptor device activity. The devices can be arranged respectively to store the partially transferred item of content in respective memory means for subsequent continued transmission. Alternatively, the devices may be configured to terminate the transmission and re-transmit the whole item of content during a subsequent low (acceptable) activity period, which may be the next low (acceptable) activity period. It would be advantageous to configure the content receptor device to provide the user with the option to continue with the download of the item of content or suspend/terminate the download until a subsequent low (acceptable) activity period, which may be the next low (acceptable) activity period, and to arrange the devices to operate in this manner.

The or each item of content can have an associated transmission duration which can be analyzed by the content transfer control means, and the content transfer control means is arranged to analyze whether a sufficient duration of an acceptable level of device activity is available for the transfer of the content. The acceptable level of activity may be low device activity. In such embodiments, the content transfer control means is arranged to transfer the item of content if a sufficient time duration is available to transfer the whole, or a significant proportion, of the item of content.

In one embodiment, the content transfer control means may be arranged to compress the content. This may be done using content/data compression algorithms stored on the memory means, and may be done once the content has been transferred to the memory means of the content receptor device or during the transfer process. Compression of content is ordinarily a processing intensive task, and this embodiment of the invention performs this processing intensive task according to acceptable device activity periods, when sufficient processing capacity should be available without unduly affecting device performance.

The transferred content, which may have been compressed previously, would advantageously be removed from the memory means to leave the compressed content. This may occur immediately following, or during, the compression by the content transfer control means, or at some later time, such as a subsequent level of device activity. The removal may be by deletion or transfer to a storage area, e.g. on a content provider device, or onto a removable memory card of the content receptor device. Such an embodiment, increases the amount of memory space available on the memory means for subsequent storage of content.

In another embodiment, the content transfer control means may be arranged to configure the content into a form suitable for delivery using the particular delivery capabilities of the content receptor device. This embodiment makes efficient use of device processing resources to configure the content at a time when the content receptor device resources are at acceptable levels of activity. Furthermore, such an embodiment does not require any modification to a content provider device, which can be provided to deliver content to content receptor devices having different delivery capabilities.

For example, the content transfer control means may be arranged to reformat the content into a form suitable for display on a display means of the content receptor device. This may be done by considering the particular screen capability/size/resolution of the content receptor device, and re-configuring the content into a format particularly suitable for display on the content receptor device screen. This would be particularly advantageous in mobile content receptor devices which often have a display screen of limited capability/size/resolution, and are thus not able to fully display "rich content". So, for example, the content transfer control means may be arranged to configure a high resolution image into a lower resolution image, or replace color content with black and white content, or remove advertising messages to leave the core content which would be useful to a user.

In another case, the content transfer control means may be arranged to filter out either visual or audible content from content comprising audio and visual content, to leave either audio or visual content. So, in the case of a content receptor device having audio means but no screen display, the device can be configured to remove visual content and leave audio content for delivery to a user of the content receptor device.

Again, once this reformatted/filtered content is stored on the memory means, and the original memory content is removed from the content receptor device, memory utilization of the often limited capacity content receptor device memory means is decreased.

As part of the previously mentioned convergence process, there has been a migration towards wireless forms of connectivity, particularly in the consumer market place where the convenience associated with the absence of wireline connections is of great value to users. Accordingly, the content provider/ receptor device are arranged to comprise wireless transmission means to transfer content from the content provider to the content receptor device.

In the embodiments, the content receptor device is a portable device. Such devices generally have a limited processing/resource capability and thus the present invention does not overburden the receptor device during peak usage periods where the device resources are likely to be stretched.

The content provider device can be a fixed device, such as a television set, video recorder, a digital video broadcasting device, a wireless local area network access point device or a cellular network device.

The memory means may be internal or external to the content receptor device. The memory means may also be volatile or non-volatile memory. Removable memory cards, RAM and ROMs are included.

The content receptor device can comprise a user interface to deliver the content to a user. The user interface can be configured to deliver sound/visual content.

An item of content may be user information or application software for the receptor device to, for example, improve the functionality/operability of receptor device. The content transfer control means can be configured to allow user control of the items of content transmitted. Accordingly, the user has control over what forms on content are received by the device.

The content receptor device may also be a content provider device. The content receptor device can be arranged to initiate the transfer of content contained in its memory, into the memory of the content provider device. This would be particularly advantageous in a portable content receptor device which would ordinarily have comparatively limited memory storage capacity. This transfer of content from the content receptor device to the content provider device may also be according to a determination of device activity, for example a level falling below a threshold.

This transfer of content from the content receptor device may occur before or after the transfer of new content to the content receptor device. The transfer of content to the content provider device can be initiated before the transfer of new content to the content receptor device. This would be particularly advantageous in a portable content receptor device which would have memory space freed up which can be used to assist in the efficient decompression/re-configuration of content transferred from the content provider device. The content originally transferred to the content provider device from the content receptor device would ordinarily be re-transferred back to the content receptor device following the decompression/re-configuration of the new content.

The content transfer control means may be in hardware, software or a combination thereof. One or more of the above embodiments of the invention in isolation or m combination are within the scope of the present invention.

The invention is particularly suited to forms of content which do not require instantaneous delivery to a user e.g. a broadcast of news summary, or historical stock market movements in the previous day/week. The invention is also particularly suited to data rich content, such as a video stream, which would ordinarily occupy a relatively large amount of processing power, or other resource capability, of the content provider/receptor device. For example, it is increasingly found that the vast majority of news items do not change during the day such that the difference between a news transmission first thing in the morning and that at the end of a day is not far different. Accordingly, one embodiment of the present invention would be able to make advantageous use of this minimal difference in content to download the news items first thing in the morning, before the user has started to use his/her content receptor device, and store it in the memory means for delivery to the user at a more convenient time later on during the day.

The content receptor device may be mountable in a docking device, such as a docking cradle. Here, the docking device may include a connection to allow the charging of a battery of the content receptor device. This feature is particularly convenient when the content receptor is a mobile device, such as a mobile telephone or a personal digital assistant. The provision of a docking device allows the beneficial feature of communicating data between the content receptor device and the docking device by way of a connection forming part of the docking mechanism. In this case, any signal generated by or within the content receptor device for initiating the transfer of content may be sent to the docking device, from where it can be forwarded onto the content provider device with or without processing or modification.

In a second aspect, the present invention provides a content receptor device operable to receive content from a content provider device and store the content on memory means, the content receptor device comprising content transfer control means arranged to initiate the transfer of an item of content according to the determination of an acceptable level of device activity.

In a third aspect, the invention provides a method of providing content from a content provider device to a content receptor device, the content provider device usable to transfer content to the content receptor device, and the content receptor device operable to receive content from the content provider device and store the content on memory means, the method comprising determining an acceptable level of device activity by the content transfer control means, and in response thereto initiating the transfer of an item of content.

Methods of providing content according to the various embodiments of the first aspect of the invention, mutatis mutandis, are also within the scope of the present invention.

In order to understand the present invention more fully, a number of embodiments thereof will now be described by way of example and with reference to the accompanying drawings.

DETAILED DESCRIPTION OF THE PREFERRED EMBODIMENTS

Figure 1:
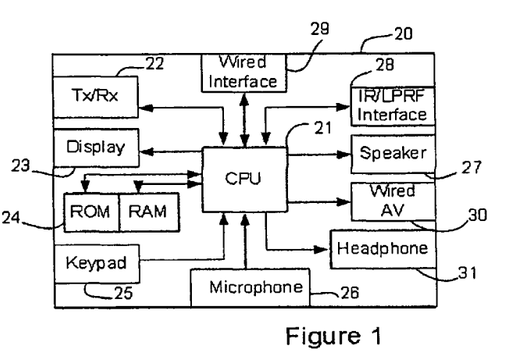
FIGS. 1 and 4 are schematic views of alternative forms of content receptor device according to the present invention.

Referring to FIG. 1, there is shown a content receptor device 20, such as a PDA, with which a user may amongst other activities, view content. Content may be taken to include video and audio files which are rendered on the content receptor device 20 by a content provider device 40.

The content receptor device 20 includes a controller 21 which co-ordinates and controls the operation of the other elements of the content receptor device 20 such as a transceiver 22, display 23, memory 24, input device 25 such as a keypad, microphone 26, and loudspeaker 27 as will be readily understood by those skilled in the art. The memory 24 comprises Read Only and Random Access portions (ROM, RAM) 35, 36 to provide storage for the code necessary to implement the functions of the content receptor device 10. The memory 24 is also used to store data which has been generated, received or is otherwise utilized by the content receptor device 20.

In addition to these elements, the content receptor device 20 is provided with separate infrared/low power radio frequency (LPRF) interface 28 and wired interface 29. The content receptor device is also provided with a wired audio/video outputs 30 and a headphone jack 31. The Infrared and LPRF interfaces 28/29 provide wireless point to point connectivity whilst the audio/video outputs 30 and headphone jack 31 expand the multimedia capabilities of the content receptor device 20.

The wireless connectivity provided by the IR and LPRF interfaces 28/29 allow connections to be made to other suitably equipped devices, such as a cellular mobile telephone, a digital television/video set and the like. The interfaces 28/29 provide the physical functionality necessary to implement their respective transport protocols. In the case of the IR interface, the protocol might be based on that proposed by the Infrared Data Association (IrDA) and whose website providing links to information on the protocol currently is to be found at www.irda.org. In the case of LPRF the protocol might be that proposed by the Bluetooth™ Special Interest Group (Bluetooth™) and whose website providing links to information on the protocol is currently to be found at www-.bluetooth.com. Transport protocols including those mentioned above allow different devices to communicate and thereby enable the sharing of applications and data. In the case of the IrDA protocol, this is typically line of site, point to point communication between two devices. Whereas, in the case of LPRF, the communication need not take place in line of site, and may extend beyond point to point in to local clusters of connected devices such as a piconet or scatternet. Whether a content receptor device 20 enters into a point to point, piconet, or scatternet connection is entirely within the control of the user through a user interface 25.

Figure 2:
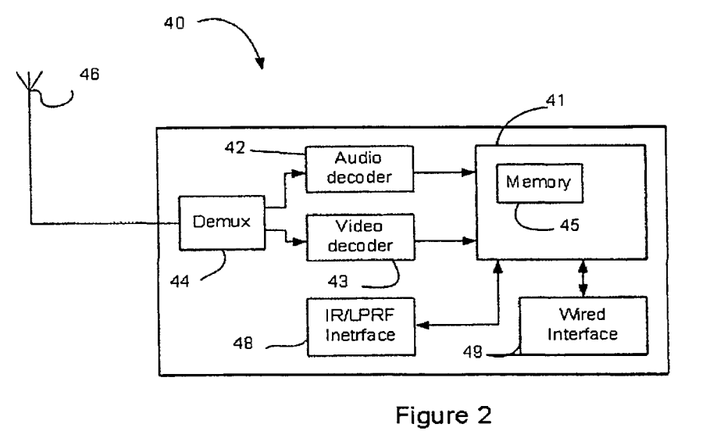
FIGS. 2 and 3 are schematic views of alternative forms of content provider device according to the present invention.

In FIG. 2, there is shown content provider device 40, such as a set-top box (STB) for delivering digital broadband broadcasts to a user. The content of the broadcasts is encapsulated within a packetized transport stream such as that provided in the ISO MPEG-2 standard, by way of example. Details of the ISO MPEG-2 standard are, of course, well known to those skilled in the art. Such transport streams may be delivered using a variety of technologies including cable, terrestrial and satellite, however for the purposes of understanding and to avoid complexity the terrestrial standard is referred to throughout the following although this should be understood to incorporate features common to the other delivery technologies.

The STB 40 includes a transport demultiplexer 44, audio decoder 42 and video decoder 43 whose operation is co-ordinated by a controller 41 having a memory 45 which provides storage for a number of functions including a host application. A transport stream is received from a RF stage connected to an antenna 46 or other such feed. The transport stream contains multiplexed compressed content streams of audio, video and data together with system information streams carrying the information required to facilitate the selection of content streams for delivery to the video and audio decoders. The output (not shown) of the audio and video decoders is delivered to rendering subsystems which includes digital to analogue converters whose own output is provided via a SCART connection or the like to a television. In a non-illustrated variant of the embodiment, the STB 40 functionality is included within the television. The output may also be delivered to a content receptor device 20 via an infrared/low power radio frequency interface 48, or a wired interface 49. These interfaces are designed to allow communications via the interfaces 28/29 of the content receptor device 20.

In ordinary operation of the STB 40, a user selects a particular content stream for rendering via a user interface, typically via a remote control. Alternatively, this functionality may be provided in the content receptor device 20. Only a part of the content may be transferred in one operation, but the whole content can be selected for transfer. In one mode of selection, the user simply enters a desired channel number at the remote control, which is transmitted via an IR signal to the STB 40 where the channel indication is analyzed by the host application utilizing the system data delivered in the transport stream to obtain a set of parameters which are then supplied to the transport demultiplexer. The parameters cause the transport demultiplexer to be configured in a manner which causes the content stream or streams to be identified in the transport stream. In another mode of selection, an on-screen display (OSD) permits a user to select directly from a program list or suchlike. The OSD is generated by the video decoder from information obtained by the host application via the controller 41. The host application generates instructions for the controller 41 which in turn configures the transport demultiplexer 44 to capture tables and program specific information from the transport stream. This information is then used to build the OSD.

According to one embodiment of the present invention, the content receptor device controller 21 monitors the time of day and is arranged to initiate transmission of content, which the user has previously selected or authorized for transmission, after midnight. Subsequently, the controller 41 in the content provider device is arranged to transmit the user selected content to the content receptor device 20 via the interfaces 28/29. This is received by the content receptor device 20 via the interfaces 48/49 and stored in the memory 24 for later retrieval by a user of the content receptor device 20.

The controller 21 may instead be arranged to determine a measure of the usage or activity of the receptor device 20, and to monitor the usage or activity over time. In a simple embodiment, a period of low activity is considered to be present if the device has not been utilized, other than perhaps by maintaining an IDLE connection with a network, for two hours, for example. Other schemes by which a period of low device activity could be inferred will be apparent. In a more complicated embodiment, the controller 21 is arranged to monitor device usage or activity over an extended period, for example a few weeks or months. From this monitoring, the controller 21 can determine times of low device activity in a predictive way. Obviously, the greater the amount of usage data and the more sophisticated the prediction algorithm, then the more accurate the predictions become. Being able to predict periods of low device activity can avoid the downside of waiting for a predetermined period (two hours in the example above), which time might otherwise be used constructively. Also, prediction capabilities can provide a device 20 with more flexible behavior, which might for example perform better if the user is employed at unusual times, for example nights and/or weekends.

When a period of low device activity is determined or predicted, as the case may be, the controller serves as a transfer control means and initiates the sending of a content request signal to the content provider device 40, which then responds by sending an item of content as appropriate.

If during the transfer of an item of content a detection is made that usage or activity is no longer low, for example a call is being made or received, then content transfer is suspended. The received part of the content is stored in the memory 45. Once the device activity level becomes low again, the controller causes the transmission to the content provider device 40 causing it to resume transmission. The two parts of the item of content are joined such that it can be handled as though it were transmitted in one transmission, rather than two. The transmission of an item of content may be broken by two or more interruptions.

In a simpler embodiment, a determination that device activity no longer is low results in transmission being terminated and the received content data being deleted from the memory 24. Here, the whole item of content must be transmitted at a later time if it is to be present in the content receptor device 20.

In either case, transmission is resumed or recommenced, as the case may be, only in a period of low device activity, be it determined or predicted.

Obviously, device usage or activity resulting directly from the reception of content is not considered in determining levels of device activity or usage.

Data compression can be carried out during periods of low device activity or usage. Following compression, the uncompressed data can be deleted, to free memory space.

Alternatively, received content which is already compressed may be decompressed under control of the controller 21 during periods of low device activity, and the compressed data then deleted in favor of the uncompressed data.

Alternatively or in addition, the controller may be arranged during periods of low device activity to configure received content into a form suitable for delivery using the particular delivery capabilities of the device 20. The reformatting may be in terms of display parameters, or in terms of filtering out (i.e. removing) an audio or visual component of the content. The filtering can take account of the capabilities of the device 20.

In another embodiment, the controller 21 in the content receptor device is arranged to analyze the format of the content received and, if required, re-configure the content into a format suitable for subsequent delivery to the user using the particular hardware/software features of the content receptor device 20. The controller 21 may also use the period of reduced activity to decompress the content if the content has been transmitted in a compressed format. In a further embodiment, the content receptor device 20 is arranged to back up the content contained in its memory 24, into the memory 45 of the content provider device 40. In a further embodiment still, any content which is not immediately required by the content receptor device 20, for example, for the device 20 to function, is initially transferred to the memory 45 prior to being re-transmitted back into the memory 24 following the transfer of new content into the memory 24.

The delivery of the content streams to a content receptor device 20 is contingent on there being a connection established with the content receptor device 40. A content receptor device 20 user who wishes to receive the content streams will have already registered his/her device with the application software of the controller 41. Such a registration process will involve the authentication of the content receptor device 20, typically before the transmission of the content streams.

Although the initiation of data transfer is expected to lead to the transfer of content from the content provider device 40 to the content receptor device 20, this may not always be possible. If, for example, the content provider device 40 is busy or unable to immediately respond for some other reason (for example because of some system error), it may reply to an initiation call from the content receptor device with a 'wait' or 'request not currently executable' signal. The content receptor device 20 may in response to receiving such a signal wait for a predetermined period before sending a further initiation call.

The content transfer control means can be arranged to initiate the transfer of an item of content upon determining a period of low device activity. Thus, the present invention uses periods of low device activity to seek the transfer of an item of content from the content provider device to the receptor device. Efficient use of device resources is thus accomplished by making efficient use of device resource downtime, such as can occur during the night-time. Also, the processing or communication resources of the device are not used for the downloading or uploading of content when the device is being used for other, time critical, purposes, or there is a high chance that it will be so used, such as during the daytime and evening. To obtain the maximum benefit, the content transfer control means forms part of the device of which the level of activity is most important. Where the content receptor device 20 is a PDA or a mobile telephone, for instance, it is the level of activity of that device which is important, so the level of activity is detected therein and the controller 21 serves as the content transfer control means. This would be convenient for a user as the user would not be delayed/interrupted during his/her usage of the device by, for example, the processor and other components in the receptor device being occupied by the concurrent downloading of a particular item of content. Alternatively, the content transfer control means may be contained in the other device, namely the device whose level of activity is not determined.

In one embodiment, the content transfer control means, which shall be described here as the controller 21 of the content receptor device, determines device activity by analyzing the passing of time and by associating low (acceptable) levels of device activity with particular times. In particular, the content transfer control means in the content receptor device is arranged to monitor the time, for example using a system clock, and to initiate a transfer of content from the content provider device at a particular pre-determined low activity time, e.g. night-time, early morning, and/or weekends, when periods of activity of the device are expected to be low (acceptable). The content transfer control means can include software which allows a user to change the times when content is transferred. For example, supposing a PDA pre-determines that 10 pm to midnight is a suitable time for transferring data content. This information is available to a user through an item on a menu of the PDA. If the user then decides that the pre-determined time is not convenient, for example because the user has planned an on-line conference with a friend, the user may change the time at which data content may be transferred to a later time. Alternatively, the user may simply specify that the pre-determined time is not convenient, in response to which the PDA determines another time period in which to transfer content, and makes this information available for display to the user. Thus, the user can program and re-program different times when the transfer of content is convenient.

The content transfer control means, such as the processor 21 of the content receiver device 20, can determine device activity by monitoring the usage of one or more of the device components, such as a processor or transmission component, over a particular period of time. A measure of the usage of the or each component is then compared to a threshold, and a low level of device usage is determined when the threshold is not exceeded. Alternatively, low activity period is considered to be present when it is detected that there has been no component usage at all, except for non-user initiated activity such as the maintenance of network connections, for a predetermined time. Here, a timer within the content receptor device is arranged to be reset at the end of each period of component usage arising from a user initiated activity, and transfer of content is initiated when the timer reaches a predetermined value. The predetermined time period may vary depending on the time of day, for example the time period may be longer during the daytime when use of the content receptor device by a user is more likely than at night-time.

In one embodiment, the content transfer control means is arranged to monitor device activity over a period of time, which might be an hour, a day, a week or a month depending on the circumstances. The transfer control means then uses the monitored device activity to predict future device activity levels, and from the predicted activity levels identify times at which the device activity is expected to be low for a suitably long duration that content transfer might be appropriate at those times. This embodiment predicts times for future acceptable activity levels based on learning from historical activity levels. The analysis of levels of activity may be limited to the determination of low levels of device activity.

Since activity levels may not stay constant during the transfer of content, one or each of the devices 20, 40 is arranged such that transfer content can be suspended and an indication of what data has been transferred and/or what data remains to be transferred stored at an appropriate location. Content which has been received at the content receiver device remains stored, and the corresponding data may be deleted from the content transmitter device. Alternatively, the devices may be configured to terminate the transmission and re-transmit the whole item of content during a subsequent low activity period, which may be the next low activity period. Software in the content receptor device can cause it to provide the user with the option either to continue with the download of the item of content or to suspend the download until a subsequent low device activity period, and to control the devices appropriately depending on the user input.

In one embodiment, a transmission duration is estimated for each item of content, for example by dividing a value equal to the size of the file by a value equal to an expected transfer rate. The transmission duration for an item of content is considered by the content transfer control means, which then makes a decision on whether the content should be begun to be transferred based on the expected transmission time and on the expected duration of low level device activity. Only if a reasonable chance that the content is transferable without interruption is determined does the content transfer control means initiate transfer. The decision as to whether or not to initiate transfer is made depending on factors such as the time remaining to the next expected period of low device activity and the age of the content to be transferred. If a determination is made that a suitably long period of low device activity is not expected for an unacceptable period of time, the content transfer control means is controlled by software to initiate transfer and, if transfer is suspended for any reason, to resume transfer as soon as low device activity is again detected, even if the period of low device activity is not known or expected to be of sufficient duration to allow the remainder of the content to be transferred without further suspension.

In one embodiment, the content transfer control means may be arranged to compress the content. This may be done using content/data compression algorithms stored on the memory means, and may be done once the content has been transferred to the memory means of the content receptor device or in real-time as part of the transfer process. Compression of content is ordinarily a processing intensive task, and this embodiment of the invention performs processing according to acceptable device activity periods, when sufficient processing capacity should be available without unduly affecting device performance. The transferred content, which may have been compressed previously, would advantageously be removed from the memory means to leave the compressed content. This may occur immediately following, or during, the compression by the content transfer control means, or at some later time. The removal may be by deletion or transfer to a storage area, e.g. on the content provider device, or onto a removable memory card of the content receptor device. Such an embodiment increases the amount of memory space available on the memory means for subsequent storage of content.

In one embodiment, the content transfer control means is arranged to configure the content into a form suitable for the delivery capabilities of the content receptor device. This embodiment makes efficient use of device processing resources to configure the content at a time when the content receptor device resources are at acceptable levels of activity. Furthermore, such an embodiment does not require any special hardware or software of the content provider device, which can be provided to deliver content to content receptor devices having different delivery capabilities. For example, the content transfer control means may be arranged to reformat the content into a form suitable for display on a display means of the content receptor device. This may be done by considering the particular screen capability, size or resolution of the content receptor device, and re-configuring the content into a format particularly suitable for display on the content receptor device screen. This is particularly advantageous in mobile content receptor devices which have a display screen of limited capability, either in terms of size or resolution, and are thus not able to display "rich content" to the maximum extent. So, for example, the content transfer control means may be arranged to configure a high resolution image into a lower resolution image, or to replace color content with black and white content, or to remove advertising messages to leave the useful content.

In another case, the content transfer control means may be arranged to filter out one of visual and audible content from content comprising both, leaving the other of the audio and visual content. So, in the case of a content receptor device having audio means but no screen display, the device can be configured to remove visual content and leave audio content for delivery to a user of the content receptor device.

Again, once this reformatted/filtered content is stored on the memory means, and the original memory content is removed from the content receptor device, memory utilization of the often limited capacity content receptor device memory means is decreased.

In one embodiment, the content provider device 40 is a set-top box, which stores audio-visual content, for example data received using a digital television receiver. A short program or film may comprise many megabytes of data, which is downloaded to a content receiver device 20, such as a PDA, for storage on a memory card associated therewith using a Bluetooth™ link. Here, the content is not in a form usable by the PDA. Once transfer is completed, or even before transfer is completed is allowed for by the PDA, the data in the memory card is processed into a form suitable for use. The processing might involve the modification of image signals so as to reduce the resolution to one suitable for the display provided on the PDA, and the modification of audio signals to produce a mono output having a bandwidth commensurate with that of the audio output capabilities of the PDA. The processing might also involve compression of one or both of the audio and video signals, e.g. using MPEG-4 or MP3 format, to reduce the amount of memory that is required to store the program or film. Obviously, the processing of the data can be carried out when the PDA is no longer able to communicate with the set-top box, for example when the user has taken the PDA from the user's home to the user's car. Here, the opportunities for processing data during periods of low level device activity are increased compared to the opportunities for downloading content. The PDA is arranged, though, to perform processing when the PDA is connected to a battery charging source, so that the processing does not unnecessarily consume power, if the PDA knows or expects there to be charging periods within an appropriate time period. A significant advantage of processing signals in this way is found in that the processor is not used during periods of device activity other than low device activity. Processing resources are not, therefore, used when they might be required by a user to be used for other purposes, for example web browsing.

In another embodiment, compression of data comprising content of interest is carried out by the content provider device 40, or at some other location. Here, compressed data is transferred to the content receiver device 20, such as a PDA, in an efficient form, which has the advantage that the time taken to transfer the content between the devices is reduced. However, in order for the content to be used, it must first be decompressed. The PDA 20 is arranged such that decompression processing occurs during periods of low level device activity, with decompressed data being stored locally in place of the compressed data. This has particular advantage since many devices at present, and particularly mobile devices, are not provided with sufficient processing power to enable decompression of video or other signals to be carried out in real-time. Accordingly, carrying out decompression during low level device activity periods can allow a user to avoid having to wait for his device 20 to decompress stored data before it can be viewed or otherwise used. Also, the processing resources of the PDA 20 need not be used for decompressing content data when they might be required for other purposes.

In some circumstances, the content receptor device may also serve as a content provider device. For example, supposing a PDA 20 has stored in its memory compressed data concerning an audio-visual object which consumes a large proportion of the available memory. If the user then wanted to download from a content provider device content for which there is insufficient space in the memory, the PDA would detect this before transfer had been initiated and as a result a transfer initiation signal is not sent. Instead, the PDA 20 signals to the content provider device 40 that it requires the uploading of content for storage thereby. Following receipt of an acknowledgment signal, the PDA 20 transmits the data comprising the audio-visual object to the content provider device, which then stores it in its memory. On detection that the file has transferred, the PDA then sends a signal initiating transmission from the content provider device of the required file. The file uploaded to the content provider device 40 may then be downloaded at any subsequent time, if for example the PDA 20 has deleted the second file upon instruction from the user. The transfer of content from the PDA 20 to the content provider device 40 is dependent on a determination of device activity. The PDA 20 may be arranged subsequently to process the received content so as to compress it, so that it requires less memory for storage. Following compression, then PDA 20 then stores the compressed content in memory, and deletes the uncompressed content. If the amount of free memory present in the PDA 20 following this procedure is sufficient, the PDA 20 may then initiate transfer of the audio-visual object from the content provider device 40 back to the PDA 20 for storage therein. As a result, the PDA 20 comes to have stored therein both content files after having compressed the second file even though it did not have sufficient memory to store the first file and the second file, when un-compressed, simultaneously.

The invention is particularly suited to forms of content which do not require instantaneous delivery to a user e.g. a broadcast of news summary, or historical stock market movements in the previous day/week. The invention is also particularly suited to data rich content, such as a video stream, which would ordinarily occupy a relatively large amount of processing power, or other resource capability, of the content provider/receptor device. For example, it is increasingly found that the vast majority of news items do not change during the day such that the difference between a news transmission first thing in the morning and that at the end of a day is not far different. Accordingly, one embodiment of the present invention would be able to make advantageous use of this minimal difference in content to download the news items first thing in the morning, before the user has started to use his/her content receptor device, and store it in the memory means for delivery to the user at a more convenient time later on during the day.

The content receptor device 20, especially when implemented as a PDA, may be used in conjunction with a docking device (not shown), which may or may not include a battery charging facility. Docking devices are known; the advanced desktop charger available for use with the Nokia Communicator™ being one such example. Here, data can be communicated between the content provider device 40 and the docking device via a wired or a wireless link, and communicated between the content receptor device 20 and the docking device by way of a connection forming part of the docking mechanism. In this case, a signal generated by the content receptor device for initiating the transfer of content may be sent to the docking device, where it is forwarded onto the content provider device 40 with or without processing or modification.

Figure 3:
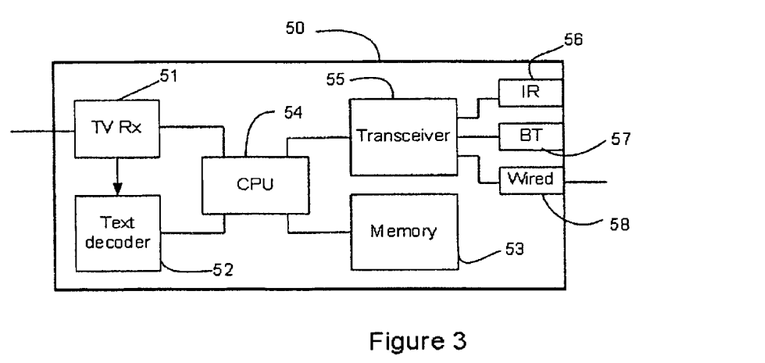

An alternative form of content provider device is shown in FIG. 3. Referring to FIG. 3, a set top box (STB) 50 is shown comprising a television (TV) receiver 51, a text decoder 52 and a cache memory 53 all connected to a CPU (central processing unit) 54. The television receiver 51 is arranged to receive television signals from a source (not shown), which may be a TV antenna, a satellite dish or a cable source for example, and to provide parts of the signal containing text signals for decoding by the text decoders 52. In this context, the term 'text signals' will be understood to mean secondary content such as that conveyed by the 'teletext' and 'ceefax' systems in the UK or the 'teksti TV' system in Finland. On analogue TV signals, this information is transmitted as digital signals during parts of the TV signal between the last line of one frame and the first line of the following frame. This term will also be understood to include other secondary content such as that sent under the 'super text TV' system proposed for future European digital TV broadcasts, which could include short video clips and/or audio-visual clips. Although in analogue TV systems, text signals are sent in unused portions of the video signal, text data may be sent in separate channels as in DVB (digital video broadcasting).

Present text TV systems carry up to 1000 or so pages of text information concerning current affairs, sports news, share prices, TV and radio program schedules, flight information and the like. Each page is transmitted regularly. The content of the pages is updated periodically by operators of a system control centre.

The CPU 54 is arranged to analyze the text information decoded by the text decoder 52 and to store data for each transmitted page in the memory 53. The CPU 54 is arranged such that when a new page of text data is received, the data existing in the memory 53 for that page is overwritten with the new data. In this way, the data stored in the memory 53 is the most recently transmitted data.

Various enhancements are possible. For example, the CPU 54 may be arranged for detecting whether any data on a page is corrupted, by interference for example, and save in the memory 53 only those pages which are uncorrupted. Alternatively, where only part of a page of data is corrupted, the corrupted parts may be stored in the memory 53 and data from a previously received page or pages used to fill the part of parts of the most recent page which contained corrupted data.

Figure 4:
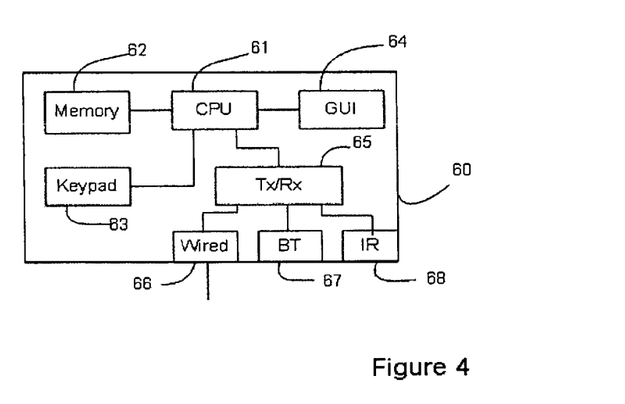

The CPU 54 is also connected to a transceiver 55, which includes one or more of an infra-red port 56, a Bluetooth™ port 57 and a wired port 58, thus allowing data transfer to, and maybe also from, the content receiver device 20. The content receptor device 20 may take the form of a mobile telephone or personal digital assistant (PDA) 60, as shown in FIG. 4. Here, the usual components are found, namely a CPU 61, which is connected to each of a memory 62, a keypad 63, a graphical user interface 64 and a transceiver 65. One or more of a wired port 66, a Bluetooth™ port 67 and an infrared port 68 are connected to the transceiver 65. Of course, the content receptor device 20 may take any other suitable form, and may, for example, include a touch-screen instead of the keypad 63. Operation of the telephone or PDA 60 generally is conventional, except that it includes means for initiating content transfer, for handling downloaded content, and optionally for allowing a user to specify required content. Also included can be means for determining the level of activity of the telephone or PDA 60, which may take any of the forms described above with reference to FIGS. 1 and 2.

The signals received at the TV receiver 51 may be digital signals, for example an MPEG-2 transport stream. In this case, the text decoder 52 can be omitted, since text decoding functions can be carried out by the CPU 54.

Although the apparatus 50 is described as part of a set-top box 51, it may equally will be included as part of a TV set, video recorder, digital TV receiver or the like. In such an embodiment, it may be desired to omit the Bluetooth™ module 57. The apparatus 50 may be battery-powered or mains-powered, and it will be appreciated that the apparatus could be included in a housing having a volume of 200 cm$^3$ or less.

In one embodiment, the apparatus 50 is arranged to record the update time (and optionally date) of teletext pages. The update time and date may be transmitted with the teletext page itself, or the apparatus 50 may determine it as the time of receipt of an updated page. In this respect, existing pages may be compared to newly received pages to determine if the content thereof has been updated. With the apparatus 50 knowing the update times of the teletext pages and the last time of download to the content receptor device 20, it is fairly easy for the apparatus to transmit only those pages which have been updated since last download. This avoids the downloading of pages which are already stored in the content receptor device 60. The last download time may be communicated from the content receptor device 60.

Instead of inferring which pages do not need downloading from the update and last download times, this may be determined by maintaining a record in the apparatus 50 of the last download time for each page or group of pages.

Alternatively, the apparatus 50 is arranged to send a list containing page numbers and the corresponding update time of the pages to the content receptor device 60, which then replies with a list of pages which are required because they are new or have been modified, or because they are of other interest to the user.

In a simple embodiment, though, no distinction is made between pages which have been updated since last download, and those which have not.

The content receptor device 60 can be arranged to allow a user to define teletext pages of interest. This may be by identification of a category or subject, such as sport results, stock market information etc., by identification of the page numbers of interest (e.g. pages 250 to 300 containing sports information) or in any other suitable way. In this case, only the pages which are of interest are downloaded from the apparatus 50 to the content receptor device 60. The deselection of pages not of interest may be carried out by the apparatus 50, following receipt from the content receptor device of signals indicating the pages, categories or subjects which are of interest, with or without filtering to take account of page update since last download. Alternatively, if a list of pages and update times is transmitted to the content receptor device 60, it can request only those pages which have been updated or are new and which are recognized as being of interest to the user.

Again, the content receptor device 60 may be used in conjunction with a docking device (not shown), which may or may not include a battery charging facility. Here, data can be communicated between the content provider device 40 and the docking device via a wired or a wireless link, and communicated between the content receptor device 60 and the docking device by way of a connection forming part of the docking mechanism. In this case, a signal generated by the content receptor device for initiating the transfer of content may be sent to the docking device, where it is forwarded onto the content provider device 40 with or without processing or modification.

What is claimed is:

1. A device comprising:
a user interface configured to allow a user to select an item of content,
one or more components, and
a content transfer controller configured to determine an acceptable activity period by monitoring usage of the one or more components over a particular time duration, and wherein the content transfer controller is configured to determine that an acceptable activity period is present when the usage of the one or more components is determined to have been below a particular threshold level over the particular time duration, the content transfer controller being arranged:
to initiate transfer of the selected item of content from a content provider device according to the determination of an acceptable activity period,
to receive the selected item of content, and
to store the received item of content on memory.

2. A system comprising the device as claimed in claim 1 and a content provider device, wherein the device of claim 1 comprises a content receptor device, wherein the content provider device is operable to transfer the selected item of content to the content receptor device upon initiation by the content receptor device.

3. A system according to claim 2, wherein the content provider device is arranged to configure the selected item of content into a form suitable for delivery with regard to delivery capabilities of the content receptor device.

4. A system according to claim 2, wherein the content provider device includes a wireless transmitter for conveying the selected item of content to a wireless receiver of the content receptor device.

5. A device according to claim 1, wherein the content transfer controller is arranged to compress the received item of content.

6. A device according to claim 1, wherein the content transfer controller is arranged to distinguish between different threshold levels of device activity.

7. A device according to claim 1, wherein the content transfer controller is configured to terminate the transfer of the item of content upon interruption of an acceptable level of device activity by an unacceptable level of device activity.

8. A device according to claim 1, wherein the content transfer controller is configured to suspend the transfer of the item of content until a period of acceptable device activity upon interruption of an acceptable level of device activity by an unacceptable level of device activity.

9. A device according to claim 1, wherein the selected item of content has an associated transmission duration which can be analyzed by the content transfer controller, and the content transfer controller is arranged to analyze whether a sufficient duration of an acceptable level of device activity is available for the transfer of the selected item of content.

10. A method comprising:
allowing a user to select an item of content via a user interface,
determining an acceptable level of device activity by a content transfer controller by monitoring usage of one or more components of a content receptor device over a particular time duration and by determining that an acceptable activity period has occurred when component usage is determined to have been below a particular threshold level over the particular time duration,
in response to determining an acceptable level of device activity, initiating transfer of the selected item of content,
receiving the selected item of content at the content receptor device, and
storing the received item of content on a memory of the content receptor device.

11. A device comprising:
a user interface configured to allow a user to select an item of content,
a second device, and
a content transfer controller configured to determine device activity by analyzing activity of the second device over a time duration and to predict therefrom acceptable device activity levels for subsequent time durations, the content transfer controller being arranged to initiate transfer of the selected item of content from a content provider device at a predicted time of acceptable device activity level, the device being operable to receive the selected item of content and to store the received item of content on memory.

12. A device according to claim 1, wherein the content transfer controller is arranged to determine device activity by monitoring the usage of one or more components of the second device over the time duration.

13. A device according to claim 11, wherein the content transfer controller is arranged to distinguish between different threshold levels of device activity.

14. A device according to claim 11, wherein the content transfer controller is configured to terminate the transfer of the item of content upon interruption of an acceptable level of device activity by an unacceptable level of device activity.

15. A device according to claim 11, wherein the content transfer controller is configured to suspend the transfer of the item of content until a period of acceptable device activity upon interruption of an acceptable level of device activity by an unacceptable level of device activity.

16. A device according to claim 11, wherein the selected item of content has an associated transmission duration which can be analyzed by the content transfer controller, and the content transfer controller is arranged to analyze whether a sufficient duration of an acceptable level of device activity is available for the transfer of the selected item of content.

17. A device according to claim 11, wherein the content transfer controller is arranged to compress the received item of content.

18. A system comprising the device as claimed in claim 11 and a content provider device, wherein the device of claim 11 comprises a content receptor device, wherein the content provider device is operable to transfer the selected item of content to the content receptor device upon initiation by the content receptor device.

19. A system according to claim 18, wherein the content provider device is arranged to configure the item of content into a form suitable for delivery with regard to delivery capabilities of the content receptor device.

20. A system according to claim 18, wherein the content provider device includes a wireless transmitter for conveying the selected item of content to a wireless receiver of the content receptor device.

21. A method comprising:

allowing a user to select an item of content via a user interface, determining an acceptable level of device activity by a content transfer controller by analyzing activity of a content receptor device over a time duration and predicting therefrom acceptable device activity levels for subsequent time durations, initiating transfer of the selected item of content at a predicted time of acceptable device activity levels, receiving the selected item of content at the content receptor device, and storing the received item of content on a memory of the content receptor device.

* * * * *